INVENTORS
STEPHEN A. HLUCHAN,
WERNER R. HOFMANN

Sept. 6, 1966 S. A. HLUCHAN ETAL 3,271,720
CORRECTOR FOR PRESSURE-SENSITIVE DIAPHRAGM OR CAPSULE
Filed Nov. 16, 1964 2 Sheets-Sheet 2
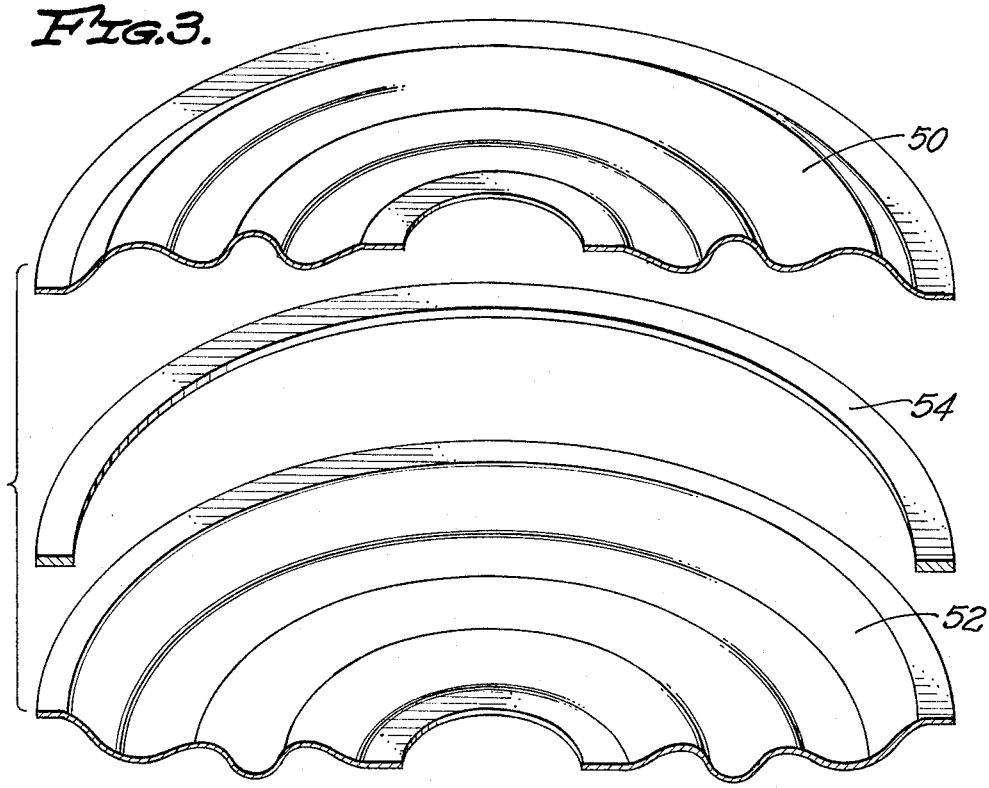
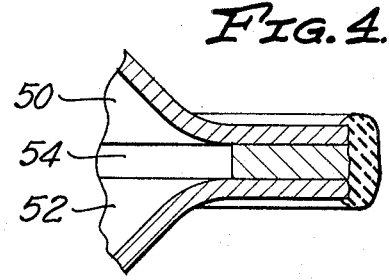
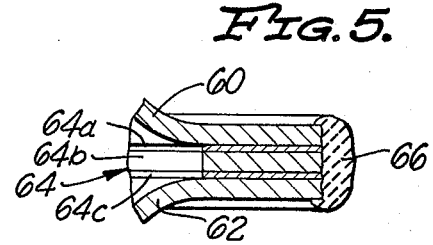
INVENTORS
STEPHEN A. HLUCHAN,
WERNER R. HOFMANN
BY

United States Patent Office 3,271,720
Patented Sept. 6, 1966

3,271,720
CORRECTOR OR PRESSURE-SENSITIVE DIAPHRAGM OR CAPSULE
Stephen A. Hluchan, Riverside, and Werner R. Hofmann, Bloomington, Calif., assignors to Bourns, Inc.
Filed Nov. 16, 1964, Ser. No. 411,272
12 Claims. (Cl. 338—42)

The invention hereinafter described pertains to pressure transducers, and more particularly to transducers employing one or more pressure-sensitive cells or capsules of the type formed by elastic walls which form a chamber and of which type an aneroid cell or capsule is typical. Specifically, the invention pertains to constructions of such pressure-sensitive cells in which compensation for errors such as zero drift incident to change of ambient temperature is effected by novel means and methods.

It is well known in the pressure transducer art that the moduli of elasticity and expansivity of materials of which deformable diaphragms, tubes, cells and the like are constructed, change with change of temperature. Thus unless corrective means are provided in an instrument using such an elastic pressure-change sensing structure the indication provided by the instrument changes with change in temperature while the pressure is maintained constant. That is, the instrument provides a correct indication of pressure at but one temperature, unless the inherent change in physical characteristics is compensated for in one way or another. Thus in the case of capsules of the aneroid type, in which a chamber is formed by two circular deformed or annularly convoluted disc-like elastic plates or diaphragms welded together around the extreme periphery, and in which a central part of one diaphragm is held fixed and the other moves in response to change of pressure differential between the interior and the exterior of the capsule, the movable diaphragm partakes of movement incident to change of ambient temperature despite absence of pressure differential on the capsule. Part of the noted movement is caused by the change of modulus of elasticity of the material of which the capsule is made, incident to change in the ambient temperature, and part of the movement is caused by expansion or contraction of various parts of the instrument; it being understood that the changes in the reading or indication of the instrument at zero pressure differential may be either additive or subtractive depending upon materials and the nature of the construction of the instrument. Correction of the first-noted type of change is generally termed "zero compensation" and correction of the second-noted type of change is similarly termed "range compensation."

Heretofore various means and modes for providing zero and/or range compensation in pressure-sensitive instruments have been proposed. Generally, one or more of bimetallic components are provided, so disposed as to introduce a corrective component or motion in the motion-transmitting linkage, as is illustrated in U.S. Patents 1,966,-753; 2,194,624; and 2,265,045, for example. The latter patents illustrate typical prior art pressure transducers employing elastic cells or capsules of the type to which the present invention is particularly applicable. Another proposal in the prior art involves application of a bimetallic disc to one diaphragm of an aneroid capsule to provide some measure of both zero compensation and range compensation. Such is disclosed in, for example, Patent No. 2,235,110. Another approach has been to interpose between the half-shells of a capsule a disc of Invar alloy, as disclosed in Patent No. 2,177,564.

Each of the prior art proposals, while effecting some measure of correction, is characterized by one or more of features that are found to be extremely undesirable in the case of instruments destined for use in environments and under conditions characterized by extreme vibration and/or high accelerations, or necessity for extreme reduction of weight of the instrument and for maximum strength of parts, reduction of friction to negligible values, and extreme accuracy coupled with long useful life. For example, the use of lever-like bimetal strips, links or rods as in the first three-noted patented structures, renders each extremely vulnerable to damage if the respective instrument is subjected to severe vibration. The same is true of the instruments disclosed in the two last-mentioned patents. In the first of those two devices the bimetal disc beats a rapid tattoo on one convolution of the capsule, and further introduces an obvious nonlinearity (error) in the response of the instrument. In the second of the devices, the large extra mass of the disc is undesirable, and the Invar could at best provide zero shift correction for but one particular capsule material and dimensional configuration. In theory, the effect of the Invar disc, having as it does a thermal coefficient of expansion that is substantially zero, prevents radial expansion of the half-shells of the capsule. However, diametral dimension stability is substantially the only certain result secured by the noted device, and the capsule height is not controlled so as to obtain zero shift compensation.

It also is a known practice in the prior art to incorporate a thick ring between the peripheries of half-shells of a pair of very thin corrugated diaphragms, to provide sufficient material to permit peripheral welding of the shelf-shells without gross distortion. The practice has been to use material for the ring that is of the same composition as that of the half-shells.

The presently-disclosed invention, by proper choice of shape and of material of a zero-shift compensating device, avoids all of the noted undesirable features of the prior art structures and provides capsules having excellent zero-shift compensation without detrimental side-effects, without appreciable adverse increase of mass of the capsule, with concurrent desirable increase of strength and stability of the capsule, and with capability of providing compensation for a variety of configurations and sizes of capsules formed from any of the normally-used alloys. The noted meritorious improvements in pressure-sensitive capsules and methods of producing such capsules are achieved by interposing between the peripheral annular flanges of the half-capsule diaphragms or shells, a flat-surfaced annular compensation ring composed of an alloy selected to provide the proper amount of diametral expansion or contraction to compensate for axial elongation or contraction of the cell induced by or due to temperature changes. The ring is fusion-united to the two shells around the respective peripheries (as by soldering, brazing or welding) to integrally unite the three components and provide a fluid-tight and structurally stiff and strong joint or juncture. The extent or degree of diametral dimension change induced by the ring is different for differing alloys from which the capsule halves are constructed or formed, and also depends upon the dimensional configuration and characteristics of the capsule.

Since shell-halves or cells are formed of sheet material of any of a number of different alloys, depending upon requirements relative to pressure range, corrosion resistance, environmental temperature, strength, etc., and since cells must be made of various diameters and of various expansivities because of widely different pressure ranges that must be accommodted by the instruments, it is required that the material and dimensions of the compensator ring be selected to give optimum compensation of the undesired dimensional changes of the diaphragms or half-shells incident to temperature changes. The thickness of the ring must be such that the ring is stronger than the rims of the half-shells to which it is to be fusion-united, to insure that the diametral dimensional change of the ring controls the diametral dimensional change of the half-shells. Thus, in general, the thickness of the ring must be at least equal to or greater than that of the rim portion of the cell or diaphragm to be compensated. Since the effect on the helf-shells or diaphragms of temperature changes is to change the axial position of the center point, much as the latter is changed by pressure changes, the desired effect to be produced by the ring is a forced transverse or diametral change of dimension of the diaphragm of exactly the extent required to compensate for the temperature-induced axial dimension change. The result is secured by using for the ring a material having the right temperature coefficient of expansion. Two typical illustrative examples will hereinafter be described in detail.

The preceding general description of the invention makes it evident that it is a principal object of the invention to provide means for compensating pressure-sensitive cells or diaphragms for changes caused by variation of ambient temperature.

Another object of the invention is to provide means for preventing change or drift of the zero of a pressure transducer cell or diaphragm during change of the ambient temperature.

Another object of the invention is to provide means for effecting temperature compensation of pressure-sensitive cells of pressure transducers without objectionably affecting the other physical characteristics of such cells.

Other objects and advantages of the invention are hereinafter set forth in the appended claims or are made evident in the following detailed description of a preferred illustrative example of the invention as incorporated in a known type of pressure transducer and as illustrated in the accompanying drawings forming a part of this disclosure. In the drawings:

FIGURE 3 is an exploded view of sections of a pressure-sensitive cell similar to that depicted in FIGURE 1;

FIGURE 4 is a magnified fragmentary view in section illustrating the fusion-union of three members of a pressure-sensor capsule according to the invention; and FIGURE 5 is a view similar to FIGURE 4, illustrating a laminated form of corrector ring.

Figure 1:
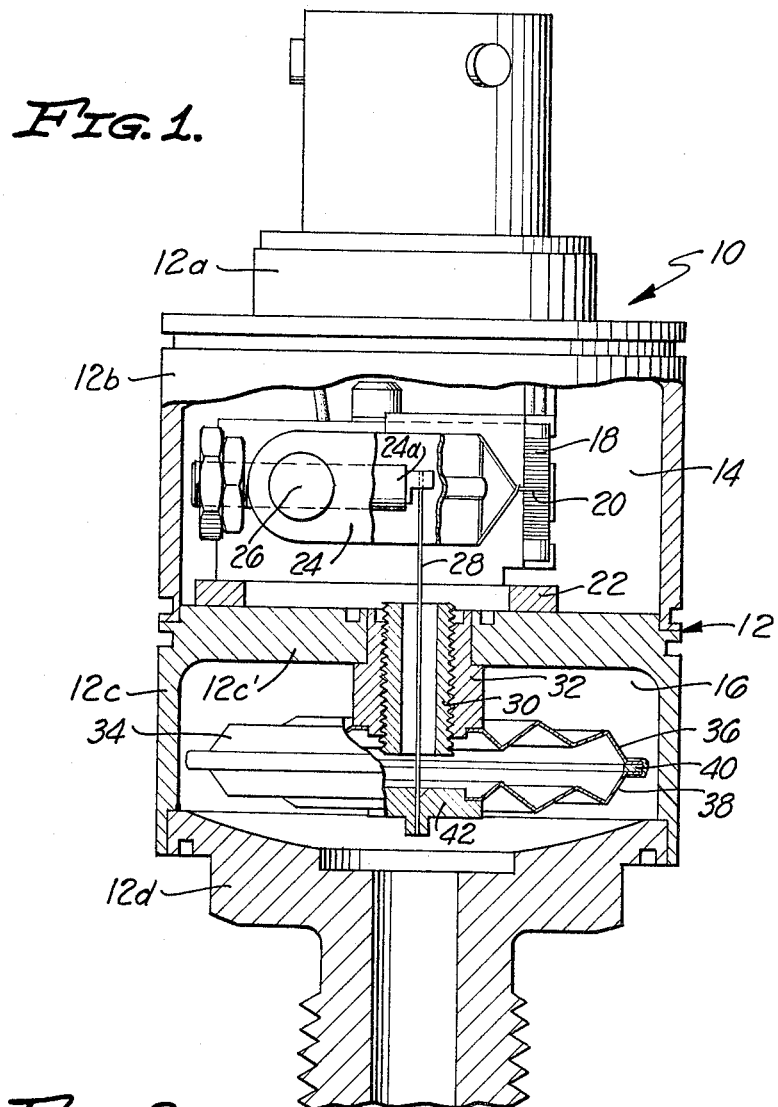
FIGURE 1 is a view in elevation, partly in section, depicting to enlarged scale certain operating components of a potentiometric pressure transducer in which a pressure-sensitive device incorporating the principles of the invention is utilized.

Referring to the drawings and to FIGURE 1 in particular, a potentiometric pressure transducer 10 comprises a housing 12 of generally cylindrical form and including sections 12a, 12b, 12c and 12d that are fusion-united as by heliarc welding to provide in conjunction with means presently to be described, fluid-tight compartments or chambers 14 and 16 are indictaed. Potentiometer means including a resistance element 18 and a movable contact or wiper 20 are supported on a base 22 that is adjustably affixed to a web 12c' of section 12c of the housing. The potentiometer wiper 20 is arranged and disposed for wiping contact along element 18, being mounted on a rocking lever means 24 that is mounted for limited rotational movement about an axis indicated at 26. The lever means includes a driving lever arm 24a to which movement is transmitted by a transmitter 28 in the form of a stiff resilient wire or rod. Transmitter 28 is secured to arm 24a, and extends through web 12c' via an adjustable tubular stop member 30 that is externally threaded and turned into an internally-threaded support 32 that is fusion-sealed in an aperture formed in web 12c' as indicated.

The structure thus far enumerated is known in the prior art, and is per se not of the present invention but is illustrative of instruments in which the principles of the present invention are applicable.

Chamber 14 is isolated from chamber 16 by fluid-tight pressure-sensitive means forming an effective seal therebetween. Those means comprise an elastic diaphragm means arranged to sense the pressure differential between the two chambers, the exemplary elastic means illustrated being in the form of an elastic cell 34 comprising opposed annularly corrugated diaphragms 36 and 38, a ring 40, and a transmitter button 42. The diaphragms are fusion-united to ring 40 around the periphery of the latter, as by welding, the union being continuous to provide fluid-tight junctures. The transmitter button 42 is sealed in a complementary aperture formed at the center of diaphragm 38; and the diaphragm 36 is sealed to support 32 around the periphery of a similar aperture that is complementary to a lower end portion of the support. The seals are preferably in the form of continuous welds, and thus the interior of cell 34 is in communication with chamber 14 but sealed from the ambient fluid in chamber 16. Thus the cell, which is formed from resilient material and hence is elastic, is sensitive to the difference between the pressures inside and outside the cell. Further, as is evident from the fact that the center part of diaphragm 36 is held stationary relative to the instrument housing, a change in the pressure differential between the inside and exterior of cell 34 causes a volumetric change in the cell, that is, expansion or contraction of the cell and a resultant translation of button 42 and of transmitter 28. Thus changes of the pressure differential are sensed and by the potentiometer means translated into corresponding electrical signals in a known manner.

Figure 2:
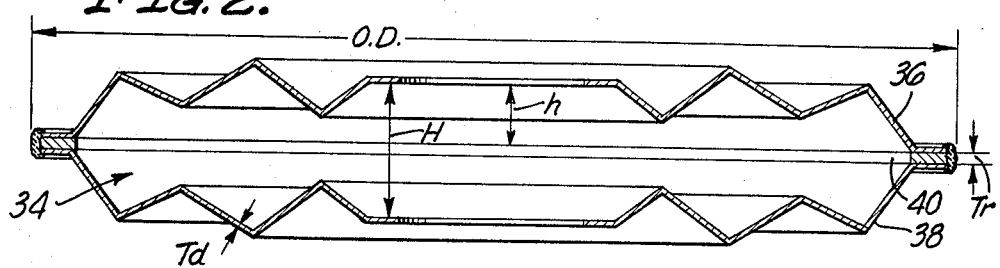
FIGURE 2 is a sectional view in elevation of principal components of a pressure sensitive cell shown in FIGURE 1, to further enlarged scale, with dimensions of interest indicated.

It is evident that the material of which the diaphragm means are made is susceptible to expansion incident to increase in the temperature of the ambient, and conversely; and thus the position of button 42 (and transmitter 28) would be expected to inherently vary with temperature change in the absence of change in the pressure differential. Such change is responsible for the zero drift or shift with temperature that has hereinbefore been discussed. Referring to FIGURE 2, it is evident that as the ambient temperature increases and the diaphragms 36 and 38 expand, the diameter of the diaphragms or half-shells of the cell 34 increases. That increase results in the case of each diaphragm in a decrease in the distance $h$ between the center portion of the diaphragm and the plane of the rim. Thus the distance along the cell axis, indicated by H in FIGURE 2, decreases; and in the absence of means to compensate for that change or of means to prevent the change, the indication furnished by the instrument is in error for all temperatures save one. The aforedescribed situation obtains whether the two half-shells are seam-welded to each other around the periphery of the cell, or are joined to a spacer or reinforcing ring of the same metal as is the common practice when the diaphragms are of very thin material as in the case of instruments for measuring in the very-low presure range.

In accord with the invention, the aforenoted change in the "height" $h$ of the diaphragm (or the height H of the cell) incident to change of ambient temperature, is substantially prevented from occurring by the provision of a flat ring 40 formed of a material having a thermal coefficient of expansion (TCE) different from that of the material from which the diaphragm means is formed. Thus, and dependent upon the TCE of the diaphragm material, the ring is formed of a selected material of different TCE such that the diametral change in the diaphragm means is constrained or restricted to the extent necessary to retain the $h$ (or H) dimension constant as the ambient temperature varies while sensed pressure differential is zero, or constant. For example, for a transducer adapted for use over the range 0–100 p.s.i.d., two opposed half-shells or diaphragms of configuration illustrated in FIGURE 2, both formed from .004" thick sheet alloy commercially available under the trade name "Ni-Span C" and characterized by a TCE equal to $4.5 \times 10^{-6}/°$ F., both of .880" outside diameter, a ring of type 302 stainless steel .005" thick of outside diameter 0.880" and inside diameter 0.800" would be employed. The TCE of the type 302 stainless steel is $9.6 \times 10^{-6}/°$ F.; and thus the differential in expansivity of the two materials is $5.1 \times 10^{-6}/°$ F. It is evident that in the case of this example, increasing temperature results in greater thermal expansion of the ring than the normal increase of diameter of the diaphragm means; and that as the axial height ($h$) tends to be increased due to expansion of the diaphragm alloy, the diaphragms are in effect radially drawn out or stretched by the expansive effort exerted by the ring. That outward stretching or forced increase of diametral expansion of the diaphragms has the effect of reducing the axial height $h$, and the net result of the two concurrently active effects is to leave the axial height $h$ of the diaphragm means substantially unchanged.

To attain complete correction or compensation of the tendency for a diaphragm or cell to change in axial dimension incident to change of temperature is not always possible when use of certain materials for the corrector ring is prohibited. However, in the instances or cases wherein extremely high temperatures are not to be accommodated, nor extremes of pressure or corrosion-resistance, it is ordinarily feasible to either substantially completely correct zero drift with temperature, or to effect marked reduction of the error attributable to the change of temperature, by selecting the material of the ring relative to that of the diaphragm means and by concurrent selection of thickness and radial width of the ring, whereby the radial stretching effect provided by the ring very closely nullifies the tendency for the diaphragm to increase in height. Materials permitting accommodation of a variety of physical conditions are listed in the accompanying Table I, in which the commonly used trade name of the material is used, and accepted values of TCE are set down.

*Table I*

| Material: | TCE, in./in./° F. (70° F.–200° F.) |
| --- | --- |
| Carpenter 22-3 alloy | $10.5 \times 10^{-6}$ |
| 304 stainless steel | $9.6 \times 10^{-6}$ |
| Nickel | $8.5 \times 10^{-6}$ |
| 310 stainless steel | $8.0 \times 10^{-6}$ |
| Inconel 718 | $7.1 \times 10^{-6}$ |
| Inconel X | $6.7 \times 10^{-6}$ |
| 416 stainless steel | $5.5 \times 10^{-6}$ |
| "Ni-Span C" | $4.5 \times 10^{-6}$ |
| Tantalum | $3.6 \times 10^{-6}$ |
| Molybdenum | $2.8 \times 10^{-6}$ |
| Invar | $1.6 \times 10^{-6}$ |

To illustrate the versatility and range of correction made possible by the use of a ring of the character indicated, it may be noted that if a ring of Invar is used between diaphragms of "Ni-Span C," the tendency of the ring during increase of ambient temperature is to oppose the expansive effort of the diaphragms and to thus produce a "negative" correction of change of axial height. While necessity for such negative correction has not been encountered in the case of diaphragms of the annularly waved or corrugated types illustrated in FIGURES 2 and 3, it may be of use in conjunction with diaphragms of other configurations, and it is of distinct utility in achieving extremely accurate compensation via lamination of rings of several materials, in a now obvious manner.

Referring now to FIGURES 3 and 4, there is illustrated a pressure-sensitive cell according to the invention, the cell comprising first and second annularly corrugated metallic diaphragms 50 and 52 characterized by a TCE equal to $N \times 10^{-6}$ in./in./° F., wherein $N$ is a numerical value between 0 and 100, and the cell further comprising a corrector ring 54 formed of material having a TCE other than $N \times 10^{-6}$ in./in./° F. As in the case of the previously described cell 34, the outer or rim portions of the diaphragms are flat and annular, and the diaphragms are fusion-united to ring 54 along the periphery of the latter to provide a fluid-tight juncture as indicated in section in FIGURE 4. The number and depths of the annular waves provided in the diaphragm, the diameter thereof, the material used, and the thickness of the diaphragm, are varied widely according to physical characteristics of the media to be sensed, the pressure range to be accommodated, spatial limitations, and other allied factors, and hence no universally applicable hard and fast mathematical relationships can be derived. As is evident, for a positive correction the ring must be of material and thickness enough to have the strength to stretch the rim of the diaphragm means to the extent required to furnish a decrease in the height $h$ (or H) of the diaphragm means equal to the increase in that height caused by the same temperature-change.

In FIGURE 5 is illustrated in fragmentary section a corrector or compensator ring 64 of laminated construction, incorporated with upper and lower diaphragms 60 and 62, the ring being fusion-united as by welding at 66 to the diaphragms in the manner hereinbefore indicated. The ring is composed of fusion-united laminae 64a, 64b and 64c, and preferably but not necessarily, laminae 64a and 64c are of the same material or at least of material of substantially the same TCE, and laminae 64b is of material of another TCE. It is evident that if the material of which ring or laminae 64b is formed provides an excessive amount of correction or compensation, appropriate reduction of the correction or compensation may be effected by the laminae 64a and 64c, and vice versa.

It will from the preceding description be evident to those skilled in the art, that the corrector or compensator ring, such as ring 40 (FIGURE 1), may be utilized to effect correction or compensation of other errors produced by temperature-shift or other physical factors in the transducer mechanism, as well as to provide compensation or correction for error introduced by change of temperature of the pressure-sensitive cell or diaphragm means. Thus, errors introduced by temperature-changes in transmitter 28, or in the lever system, or in the resistance element 18, may be compensated by first determining the magnitude of the error for various temperatures, and thus determining the extent of correction required in the motion of the sensor cell 34, and providing such correction by selection of the material or materials of ring device 40 to produce the proper correction. As is now evident, the net correction required may be either positive or negative, and hence the TCE of ring 40 may be required to be greater, or less than, that of the half-shells or principal means of the pressure-sensitive device such as cell 34. Since an indefinitely large number of sizes of diaphragms or pressure sensors are used, and a large number of annular wave or corrugation dimensions and configurations are employed and in a fairly extensive range of alloys or materials, it is evident that the composition and thickness $T_r$ (FIGURE 2) of the corrector ring to be used in a particular sensor must be determined empirically. Especially is that true where compensation for errors in other than the diaphragm means per se is to be effected. Thus according to the invention certain standard configurations and sizes of diaphragms are utilized for transducers that are widely used in noncritical applications or environments, and standard rings of material and thickness selected to provide the required compensation or correction for temperature-change (and/or other) effects are fabricated, and cells or diaphragm means are fabricated from such diaphragms and specific respective corrector rings selected individually to anticipate the required correction. Illustrative examples are set out in Table II.

Table II

| Diaphragm Diameter | No. of Annular Waves | Diaphragm Thickness | Diaphragm Material | Ring Thickness | Ring Material |
|---|---|---|---|---|---|
| .880 | 5 | .002 | "Ni-Span C" | .005 | Type 302 St. St. |
| .880 | 3 | .006 | ----do---- | .010 | Do. |
| .880 | 2 | .010 | ----do---- | .015 | Do. |
| 1.250 | 4 | .003 | ----do---- | .005 | Do. |
| 1.750 | 5 | .004 | ----do---- | .005 | Do. |

The preceding description including representative exemplary and preferred physical constructions according to the invention makes it evident that the aforenoted objects of the invention have been attained. It is also evident that in the light of the disclosure, various changes and modifications of the specific structures illustrated may be made within the spirit and scope of the invention; and accordingly it is not desired that the invention should be limited to exact details of the exemplary embodiments other than as indicated in the claims.

We claim:

1. A potentiometric transducer comprising, in combination:
   first means, including potentiometer means and lever means operably connected to the potentiometer means to operatively vary the latter;
   second means, including pressure-sensitive means comprising annularly deformed diaphragm means of substantially circular shape and of material characterized by a predetermined thermal coefficient of expansion, said diaphragm means arranged with a surface to be exposed to fluid under pressure to be deformed thereby to translate a movable portion of said diaphragm means as a measure of the applied pressure, and said second means including connecting means connecting said movable portion to said lever means to operate the latter incident to movement of said movable portion of said diaphragm means incident to deformation of the latter;
   third means, including housing and support means for said first and second means, said third means providing a chamber and a fluid-admission passage thereinto and providing a seal and support for said diaphragm means; and
   fourth means, including a ring annulus fusion-united to said diaphragm means at the periphery of the latter, said ring annulus being formed of a selected material characterized by a predetermined thermal coefficient of expansion different from that of said diaphragm means;
   whereby with constant pressure applied to said diaphragm means the tendency of said diaphragm means to change dimension and move said connecting means and lever means incident to change of the ambient temperature at said transducer is compensated and corrected by the tendencies of said diaphragm means and said ring annulus to expand differently due to the differing thermal coefficients of expansion thereof.

2. A potentiometric transducer according to claim 1, in which said diaphragm means comprises a pair of opposed annularly deformed diaphragms to the peripheries of which said ring annulus is fusion-united, said diaphragms having respective middle portions and the middle portion of one of which is fusion-united to said support means and the middle portion of the other of which provides said movable portion.

3. A potentiometric transducer according to claim 1, in which said ring annulus is composed of fusion-united laminae of different materials characterized by respective different thermal coefficients of expansion, the different materials and the thicknesses of the laminae being preselected to provide a desired net coefficient of expansion to provide a desired compensation for said diaphragm means.

4. A potentiometric transducer according to claim 3, in which said diaphragm means comprises a pair of opposed annularly deformed diaphragms to the peripheries of which said ring annulus is fusion-united, said diaphragms having respective middle portions and the middle portion of one of which is fusion-united to said support means and the middle portion of the other of which provides said movable portion.

5. A potentiometric pressure transducer comprising, in combination:
   first means, including potentiometer means and lever means operably connected to the potentiometer means to operatively vary the latter;
   second means, including pressure-sensitive means including diaphragm means of substantially circular outline and of material having a thermal coefficient of expansion of $N \times 10^{-6}$ in./in./° F. wherein N is a numerical value in the range from 0 to 100, said diaphragm means being arranged with a surface exposed to fluid under pressure to be deformed by the latter, and transmitter means connected to said diaphragm means to be translated thereby incident to deformation of the diaphragm means, and said transmitter means connected to said lever means to operate the lever means and thereby the pontentiometer means incident to deformation of the diaphragm means;
   third means, including housing and support means for said first and second means, said third means providing a chamber and a fluid-admission port thereinto and providing a seal and support for said diaphragm means; and
   fourth means, including a ring annulus fusion-united to said diaphragm means at the periphery of the latter, said ring annulus being of material having a thermal expansivity in the radial direction different from that of said material of said diaphragm means;
   whereby with constant fluid pressure applied to said diaphragm means, the tendency of said potentiometer means to be varied due to and incident to change of the ambient temperature at said transducer is counteracted and corrected by the tendencies of said diaphragm means and said ring annulus to expand differently.

6. A potentiometric transducer as defined in claim 5, in which said diaphragm means comprises a pair of opposed annularly deformed diaphragms to the peripheries of which said ring annulus is fusion-united, said diaphragms having respective middle portions and the middle portion of one of which is fusion-united to said support means and the middle portion of the other of which provides said movable portion.

7. A potentiometric transducer according to claim 6, in which said ring annulus is composed of fusion-united laminae of different materials characterized by respective different thermal coefficients of expansion, the different materials and the thicknesses of the laminae being preselected to provide a desired net coefficient of expansion to provide a desired compensation for said diaphragm means.

8. An elastic pressure-sensitive device comprising:
   first means, including an annularly deformed substantially circular diaphragm having an annular rim portion and a middle portion arranged to move relative to said rim portion in response to pressure exerted on one face of the diaphragm, said diaphragm being formed of material having a temperature coefficient of expansion of $N \times 10^{-6}$ in./in./° F., wherein N is a numerical value in the range from 0 to 100;
   and second means, including a ring annulus of substantially the same outside diameter as said diaphragm, fusion-united to said diaphragm at the periphery of said rim portion to form an integral juncture therewith, said ring annulus being formed of material having a temperature coefficient of expansion of $(N \pm C) \times 10^{-6}$ in./in./° F., wherein C is a numerical value other than N and in the range from 0 to 100; whereby, with constant pressure exerted on said one face of said diaphragm, tendency of said middle portion to move in response to change in ambient temperature is corrected by the tendency to unequal radial expansion of said ring annulus and said rim portion.

9. An elastic pressure-sensitive device according to claim 8, said ring annulus comprising fusion-united laminae of different materials having respective different thermal coefficients of expansion.

10. A pressure transducer comprising:

first means, including housing means, providing a ported substantially closed chamber;

second means, including a radially elastic thin diaphragm means having a first surface exposed to the ambient fluid inside said chamber and an opposite second surface sealed from said first surface around the periphery thereof, said diaphragm means being arranged with a central portion movable in a direction transverse of the plane of said periphery in response to change of pressure differential between said first and second surfaces and also movable in a said direction in response to change of ambient temperature irrespective of change of pressure, said second means including a thin ring peripherally fusion-united with said diaphragm means and formed of material characterized by a thermal coefficient of expansion unlike that of said diaphragm means, whereby incident to change of ambient temperature said ring elastically changes the radial dimension of said diaphragm means in the sense and direction to correct the concurrent tendency of said diaphragm means to change dimension axially;

and third means, including electrical means, connected to said diaphragm means and responsive to axial movements of said diaphragm means to produce an electric signal representative of change of said pressure differential, whereby errors in said signal representing axial movements of said diaphragm incident to change of ambient temperature are greatly minimized.

11. A pressure transducer according to claim 10, in which said diaphragm means includes opposed annularly-corrugated thin circular metallic half-shells and a metallic ring disposed between said half-shells and fusion-united around the periphery thereof to said half-shells, an inner portion of a first one of said half-shells being sealed to said first means and an inner portion of the second of said half-shells being connected to said third means for actuation of said electrical means.

12. A pressure transducer according to claim 11, in which said ring is composed of laminae fusion-united and forming an integral ring, said laminae including laminae of at least two selected different materials characterized by respective different thermal coefficient of expansion, and said laminae being of respective thicknesses selected to cause said ring to have a radial thermal expansivity different from that of either of the laminae and different from that of said diaphragm means.

References Cited by the Examiner

UNITED STATES PATENTS

| | | | |
|---|---|---|---|
| 2,442,108 | 5/1948 | Zeller et al. | 200—83 |
| 2,534,123 | 12/1950 | Hasselhorn | 92—45 X |
| 2,756,777 | 7/1956 | Bourns et al. | 92—45 |
| 3,173,120 | 3/1965 | Marks et al. | 338—36 |
| 3,224,344 | 12/1965 | Baumann et al. | 92—45 |

RICHARD M. WOOD, *Primary Examiner.*

W. D. BROOKS, *Assistant Examiner.*